United States Patent [19]

Millot et al.

[11] Patent Number: 4,666,653
[45] Date of Patent: May 19, 1987

[54] FUEL ASSEMBLY WITH COOLED GUIDE TUBES FOR A NUCLEAR REACTOR

[75] Inventors: Jean-Paul Millot, Elancourt; Guy Desfontaines, Puteaux; Michel Babin, Pantin, all of France

[73] Assignee: Framatome & Cie., Courbevoie, France

[21] Appl. No.: 581,747

[22] Filed: Feb. 21, 1984

[30] Foreign Application Priority Data

Feb. 25, 1983 [FR] France .................. 83 03155

[51] Int. Cl.⁴ .................. G21C 7/08; G21C 3/00
[52] U.S. Cl. .................. 376/209; 376/224; 376/353; 376/449; 376/436
[58] Field of Search .............. 376/353, 224, 225, 449, 376/436, 209

[56] References Cited

U.S. PATENT DOCUMENTS

| | | | |
|---|---|---|---|
| 3,178,356 | 4/1965 | Wheelock | 376/224 |
| 3,261,756 | 7/1966 | Ripley | 376/454 |
| 3,629,066 | 12/1971 | Andersson et al. | 376/436 |
| 3,713,971 | 1/1973 | Van Santen et al. | 376/225 |
| 3,734,825 | 5/1973 | Schabert | 376/224 |
| 3,930,938 | 1/1976 | Berglund et al. | 376/353 |
| 4,229,256 | 10/1980 | Luetzow | 376/225 |
| 4,313,797 | 2/1982 | Attix | 376/353 |
| 4,486,384 | 12/1984 | Rau et al. | 376/434 |

Primary Examiner—Harvey E. Behrend
Attorney, Agent, or Firm—Pollock, Vande Sande & Priddy

[57] ABSTRACT

The invention relates to a fuel assembly with cooled guide tubes for a nuclear reactor.

It consists of a bundle of parallel fuel tubes (1) held in a structure comprising spacer grids, guide tubes (6) and end plates. At least a part of the guide tubes (10) comprises a set of guiding surfaces (16) projecting towards the interior of the tubes (10) over the whole of their length. The projections (16) are formed by embossing of the wall of the tube (10) and permit the guidance of the rod of absorbing material which is moved in the tube and the provision of circulating spaces for the cooling fluid between the tube and the rod of absorbing material.

The invention applies in particular to pressurized water reactors and to reactors with neutron spectrum variation.

7 Claims, 8 Drawing Figures

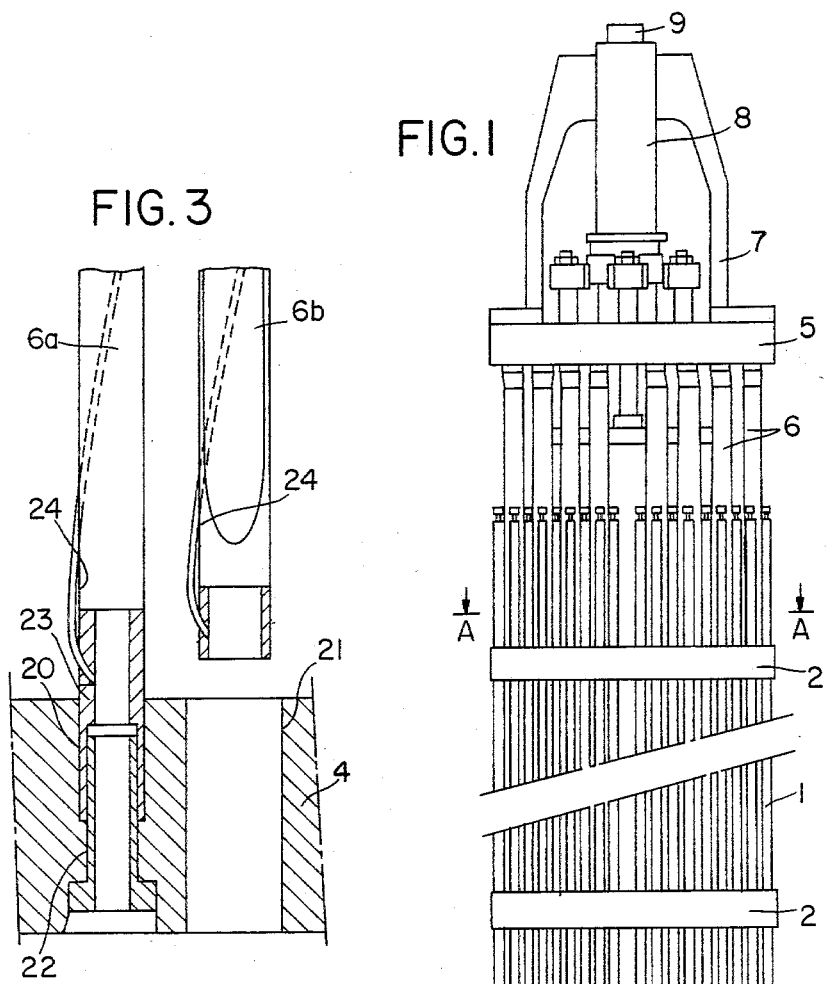
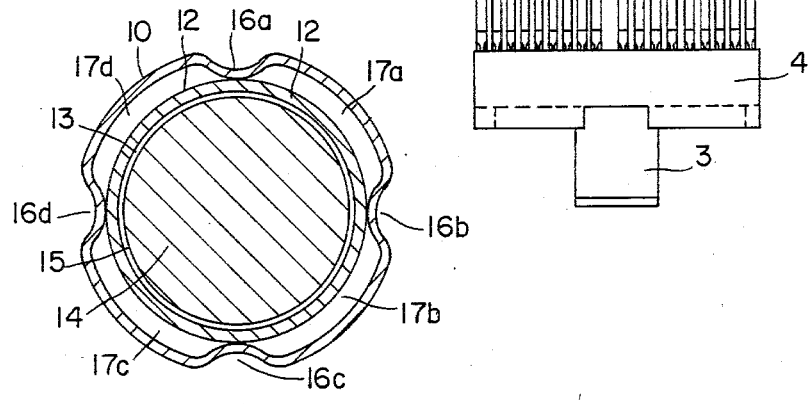

FUEL ASSEMBLY WITH COOLED GUIDE TUBES FOR A NUCLEAR REACTOR

FIELD OF THE INVENTION

The invention relates to a fuel assembly for a nuclear reactor, in particular for a pressurized water nuclear reactor.

Such fuel assemblies consist of a bundle of parallel fuel rods which are held in a framework ensuring the rigidity of the assembly. This framework comprises spacer grids for the transversal support of the rods, the grids being spaced along the assembly corresponding to the axial direction of the rods, guide tubes which replace certain fuel rods in the bundle and end plates which are fixed to at least certain guide tubes.

The guide tubes permit the guidance of rods of material absorbing the neutrons inside the assembly. Certain of these guide tubes which are connected by the ends to each of the end plates also ensure the rigidity of the assembly. Other guide tubes which are fixed to only one of the end plates can serve for the support of the spacer grids, in addition to their guiding function.

The fuel assemblies are usually arranged vertically in the reactor core, so that one of the end plates constitutes the lower end plate and the other end plate the upper plate of the assembly.

The cooling fluid of the reactor, that is water under pressure, passes through the core from bottom to top and circulates in the interior of the assemblies in contact with the fuel rods from which it draws the heat.

The rods of absorbing material which are introduced into the guide tubes are gathered together in the form of clusters which are moved about together as one inside the assemblies to regulate the power of the reactor. These cylindrical rods fit into the guide tubes with a very small clearance, so that the cooling water practically does not circulate inside the guide tubes. This, however, presents practically no disadvantage since the absorbing rods heat up little and since the cooling through the external surface of the guide tube is adequate.

PRIOR ART

In addition, a new type of nuclear reactor with improved yield has been described in French specification No. 2 535 508, in which a variation of the neutron spectrum in the core is produced by the introduction into the assemblies of rods of absorbing material which produces a variation of the spectrum both by reducing the volume of water in the guide tubes and by absorption of the neutrons of lower energy. In a preferred embodiment, these rods for spectrum variation are of a fertile material such as uranium depleted in uranium 235.

In this case, the heating of the depleted uranium rods, which are the site of the neutron reactions leading, for example, to the formation of fissile materials from the fertile material, is much greater than in the case of control rods in absorbing material.

It becomes necessary to produce a circulation of water inside the guide tubes which are reserved for the rods of fertile material.

Thought has been given to increasing the clearance between the guide tubes and the rods of fertile material, which will however cause the rods to occupy an off-center position in the guide tube. The cooling of the rod for spectrum variation is then unsymmetrical, which leads to risks of vaporization of the water in the zone in the neighborhood of the line of contact and consequently to an increase in the temperature of the rod, resulting in the deterioration of the cladding material and in distortions.

More generally, the existing structure of the guide tubes of fuel assemblies does not permit an effective cooling of the rod of absorbing material introduced into the guide tube. If this rod heats up, for example in the case where it is the site of neutron reactions producing heat, the thin layer of water existing between the rod of absorbing material and the inner surface of the guide tube can begin to boil, which further reduces the heat exchanges which allow the cooling of the rod. The heating of the rod can then lead on the one hand to risks of burn-out and of corrosion, and on the other hand to its distortion, which makes its further movement in the guide tube difficult or impossible.

SUMMARY OF THE INVENTION

It is an object of the invention to provide a fuel assembly with cooled guide tubes for a nuclear reactor, which consists of a bundle of parallel fuel rods held in a framework comprising spacer grids for the transversal support of the rods, guide tubes replacing certain rods of the bundle and serving for guidance of rods in material absorbing the neutrons inside the assembly, and of end plates fixed on the ends of at least certain guide tubes, a fuel assembly which permits an effective cooling of the rods of absorbing material without its structure, its production and its fitting being made much more complicated than for a fuel assembly of the prior art.

To this end, at least a part of the guide tubes comprises a group of guiding surfaces projecting towards the interior of these tubes over their entire length, each one produced by embossing of the wall of the corresponding tube permitting the guidance of the rods and the provision of circulation spaces for the cooling fluid, between the tube and the rod of absorbing material.

BRIEF DESCRIPTION OF THE DRAWINGS

In order that the invention may be well understood, a description will now be given, by way of a non-limiting example, with reference to the appended diagrams, of a fuel assembly for a nuclear reactor with improved yield as described in French specification No. 2 535 508.

FIG. 1 shows an elevation view of the assembly.

FIG. 2a represents a view in transversal section of a guide tube of the assembly shown in FIGS. 1 and 2.

FIG. 3 shows a view in a vertical plane section of the lower part of two guide tubes.

FIG. 1 is an illustration of a fuel assembly intended for use in a nuclear reactor of improved yield such as described in French specification No. 2 535 508. Such a fuel assembly comprises guide tubes for the movement of clusters for spectrum variation comprising fertile rods, and other guide tubes for the movement of the reactor power control rods.

Figure 2:
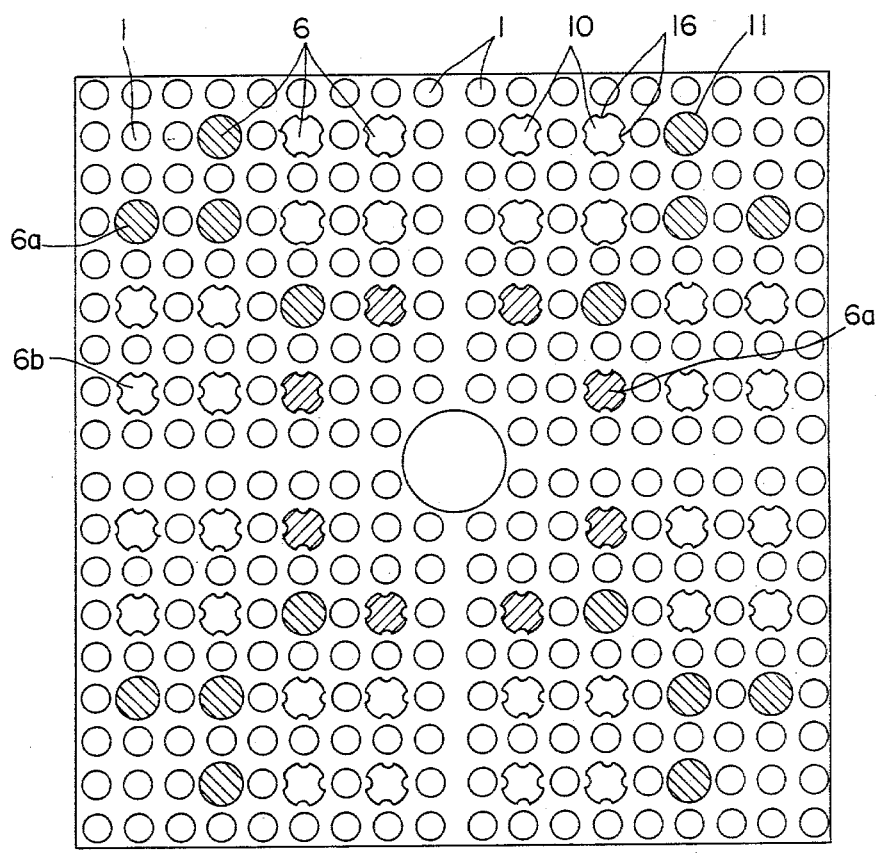
FIG. 2 shows a view in section along AA of FIG. 1.

The fuel assembly comprises a bundle of fuel rods 1 which is held transversally by spacer grids 2 distributed along the rods i.e. the height of the assembly, a Lower end plate 4 and an upper end plate 5, as well as a set of guide tubes 6 all connected to the upper end plate 5.

The upper end plate 5 is secured to a structure 7 which serves as a stop for the clusters of the absorber rods and allows the attachment of a cylinder 8 serving as a hydraulic shock absorber at the end of the travel for the pommel 9 of the cluster of fertile rods for spectrum variation. The lower plate 4 is secured to a component 3 for centering of the assembly which also serves for the protection of the device for anchoring the assembly on the bottom core support.

FIG. 2 shows the lattice of the fuel rods 1 over the whole cross-section of the assembly. Certain positions of the rods 1 are occupied by guide tubes 6 which are of two different types. Some, such as the tube 11, have a circular cross-section of a conventional type and allow the guidance of control rods of absorbing material, for the fine control of the reactor. The whole of the assembly comprises sixteen tubes 11 for the guidance of a cluster of absorbing rods.

The others, such as the tube 10, have a quadrifoliate cross-section and are used for the guidance of the fertile rods for spectrum variation, containing depleted uranium. The whole of the assembly comprises forty guide tubes such as 10 allowing the guidance of the cluster of rods for spectrum variation.

As indicated in the French specification No. 2 535 508, the cluster of the fine-control rods and the cluster for spectrum variation are set up in a coaxial configuration.

Referring to FIG. 2a a tube of quadrifoliate cross-section 10 accommodates a rod for spectrum variation 12 comprising a cladding 13 and a filling of depleted uranium 14. Between the cladding 13 and the uranium filling 14 a very thin clearance 15 is provided, permitting the expansion or the swelling of the uranium 14.

The quadrifoliate cross-section of the guide tube 10 comprises four guiding surfaces 16a,16b,16c and 16d projecting into the interior of the guide tube 10, over the whole length of the latter. These guiding surfaces 16 are produced by embossing of the wall of the tube 10 towards the interior along four generatrices, for example by means of a shaping roller or by passage through a die. The rod for spectrum variation 12 is guided by the projections 16 during its movement in the guide tube. Four spaces for water circulation 17a,17b,17c,17d are provided between the inner surface of the tube 10 and the outer surface of the cladding 13 of the rod for spectrum variation, between two successive projections 16. Within these spaces 17 cooling water is able to circulate and cool the external surface of the fertile rod 12.

FIG. 3 shows the lower end plate 4 of the assembly which is pierced with holes 20 and 21 opposite two guide tubes 6a and 6b.

The hole 20 allows for the fixing of the end of the guide tube 6a on the end plate 4 by means of a demountable threaded hollow bush 2 which is screwed into the inside of the end 23 of the tube 6a.

The end of the tube 6b is not fixed on the lower end plate 4 and the hole 21 serves only for the passage of the cooling water into the interior of the assembly.

On all the tubes 6 are wound helically metal wires 24 which improve the cooling of the guide tubes through their external surface by breaking the cold boundary layer which tends to form around the guide tubes during the circulation of the cooling water. These wires wound helically on all the guide tubes and fixed to the lower part and to the upper part of these tubes make it therefore possible to even out the temperature of the cooling water circulating in the assembly.

With reference to FIG. 2, it can be seen that for the whole assembly use is made of twenty-four guide tubes such as 6a which are connected both to the upper end plate and to the lower end plate and which take part in making rigid the framework of the assembly. These tubes 6a consist of all of the guiding tubes 11 of the control rods and certain of the guiding tubes 10 for spectrum variation.

The other guiding tubes 10 of the spectrum variation rods are all the tubes 6b which, in addition to the fixing of the spacer grids, ensure principally the guidance of the rods for spectrum variation.

Figure 4:
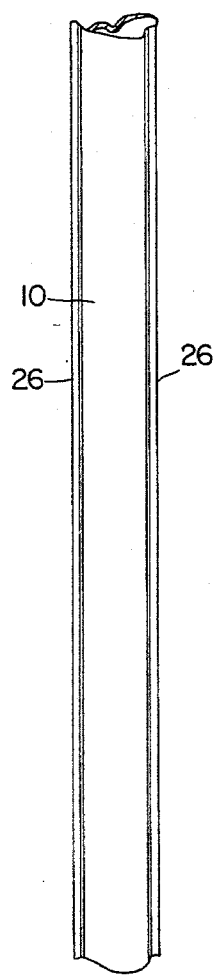
FIG. 4 shows a variation of embodiment of a guide tube of an assembly according to the invention.
Figure 4A:
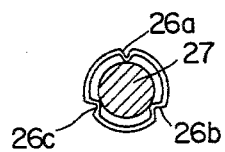
FIG. 4a shows a transversal section of the guide tube shown in FIG. 4.

FIGS. 4 and 4a show a first embodiment of the tubes 10 for the guidance of rods for spectrum variation. These tubes comprise three guiding surfaces 26 which are directed along three generatrices of the tube at 120° and are produced by embossing of the wall of the tube along these three generatrices. In FIG. 4a it can be seen that these guiding surfaces of the rod 27 make it possible to provide three spaces for circulation of the cooling water.

Figure 5:
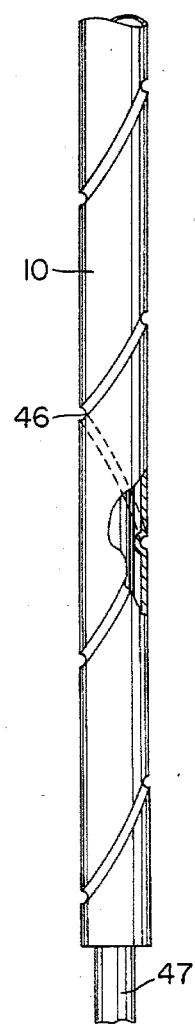
FIG. 5 shows a second variant of a guide tube of an assembly according to the invention.
Figure 5A:
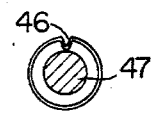
FIG. 5a is a transversal section of the guide tube shown in FIG. 5.

FIGS. 5 and 5a show a second embodiment of a guide tube according to the invention in which the wall comprises a group 46 of guiding surfaces projecting into the interior of the tube and arranged along a helix the axis of which is the axis of the tube. This projecting surface 46 permits the guidance of the spectrum variation rod 47 while providing a continuous space for circulation of cooling water around this rod 47.

The surface 46 which projects towards the interior of the tube is produced by embossing the wall of the tube. This operation may be obtained by causing the tube to rotate and by displacing it in translation along its axis under a shaping roller or by passing through a die producing the deformation into a helix.

It can be seen that the principal advantages of the fuel assembly according to the invention are to permit an effective cooling of the rods of absorbing material which are moved in the guide tubes while avoiding complication of the operation of shaping and of fitting of the guide tubes in the assembly.

The invention is not limited to the embodiments which have been described; it comprises, on the contrary, all variations.

It is thus possible to envisage guiding surfaces projecting into the wall of the guide tubes of a form and of a distribution which are different from those which have been described.

It is equally possible to envisage a distribution of the tubes contributing to rendering the assembly rigid which is different from that which has been described.

Finally, the fuel assembly according to the invention may be employed not only in a nuclear reactor of improved yield comprising clusters for spectrum variation, but also in all other types of nuclear reactor where heating and distortion of the control rods which are moved in the guide tubes of the assemblies may occur.

We claim:

1. In a spectral shift nuclear reactor having a plurality of vertically arranged fuel assemblies, a plurality of neutron absorbing rod clusters each vertically movable into and out of a particular one of said fuel assemblies, and a plurality of spectrum variation rod clusters, each spectrum variation rod being of fertile material and of circular cross-section vertically movable into and out of a particular one of said fuel assemblies, a fuel assembly-rod cluster combination comprising:

(a) a fuel assembly having a bundle of parallel fuel rods held in a framework comprising a plurality of guide tubes replacing some of said fuel rods in said bundle, two end plates connected to the ends of at least some of said guide tubes and formed with passages in alignment with said guide tubes for circulation of a cooling fluid; and a plurality of spacer grids distributed along said bundle;

(b) a cluster of cylindrical elongated fertile material containing spectrum variation rods of circular cross-section arranged for movement within and along certain only of said guide tubes;

(c) wherein each of said certain ones of said guide tubes has a generally circular cylindrical wall having an internal diameter substantially greater than the diameter of said fertile material containing rods and formed with internally projecting rib means extending throughout the length of said wall and terminating radially inwardly in close proximity to said rod, the confronting surfaces of each of said generally circular cylindrical walls and its associated said fertile material containing rod being substantially parallel throughout their length with the major portion of the inner surface of each of said generally circular cylindrical walls being parallel to the curved surface of its associated said circular cross-section spectrum variation rod, said rib means being constructed and arranged to guide and center the associated fertile material containing rod and defining a circulation space of substantially constant thickness for said cooling fluid between said fertile material containing rod and said generally cylindrical wall of the guide tube; and (d) a cluster of cylindrical elongated neutron absorbing control rods arranged for movement along the other of said guide tubes, wherein each of said other guide tubes have a circular cross-section and are securely connected to both said end plates and wherein each of said other guide tubes are free of internally projecting rib means.

2. A fuel assembly-rod cluster combination according to claim 1, wherein some of said certain ones of said guide tubes are securely connected to the upper end plate only while the other of said certain ones of said guide tubes are securely connected to both said end plates.

3. A fuel assembly-rod cluster combination according to claim 1, wherein said rib means comprises at least one rib extending helically along said tube throughout the length of said tube.

4. A fuel assembly-rod cluster combination according to claim 3, wherein said rib means consist of four ribs distributed at equal angular intervals around an axis of the associated guide tube.

5. A fuel assembly-rod cluster combination as claimed in claim 3, wherein each of said ribs has a substantially linear contact with the associated one of said spectrum variation rods along a generatrix of said guide tube.

6. A fuel assembly-rod cluster combination according to claim 1, wherein said rib means consists of at least three internally projecting ribs each formed by a longitudinal fold of said wall, extending through the length of said wall and terminating radially in close proximity to the spectrum variation rod movable therein.

7. The fuel assembly as claimed in claim 1, in which a metal wire (24) is wound helically on the external surface, and over the whole length, of each of the guide tubes (6).

* * * * *